United States Patent
Villarreal Vives et al.

(10) Patent No.: US 10,602,880 B2
(45) Date of Patent: Mar. 31, 2020

(54) FUEL-CONTAINING FIRE-STARTING DEVICE

(71) Applicants: Jose Alejandro Villarreal Vives, Morelos (MX); Rodrigo Cardenas Torres, Morelos (MX)

(72) Inventors: Jose Alejandro Villarreal Vives, Morelos (MX); Rodrigo Cardenas Torres, Morelos (MX)

( * ) Notice: Subject to any disclaimer, the term of this patent is extended or adjusted under 35 U.S.C. 154(b) by 0 days.

(21) Appl. No.: 16/076,865

(22) PCT Filed: Sep. 27, 2016

(86) PCT No.: PCT/MX2016/000096
§ 371 (c)(1),
(2) Date: Aug. 9, 2018

(87) PCT Pub. No.: WO2017/146564
PCT Pub. Date: Aug. 31, 2017

(65) Prior Publication Data
US 2019/0045974 A1    Feb. 14, 2019

(30) Foreign Application Priority Data
Feb. 23, 2016   (MX) .................... MX/a/2016/002437

(51) Int. Cl.
*A47J 37/07*   (2006.01)
*C10L 11/06*   (2006.01)
*C10L 11/04*   (2006.01)

(52) U.S. Cl.
CPC ............. *A47J 37/079* (2013.01); *C10L 11/04* (2013.01); *C10L 11/06* (2013.01); *C10L 2230/06* (2013.01)

(58) Field of Classification Search
CPC combination set(s) only.
See application file for complete search history.

(56) References Cited

U.S. PATENT DOCUMENTS 3,739,732 A * 6/1973 Graham ................ A47J 37/079
                                                    126/25 B
4,953,533 A    9/1990 Witt
(Continued)

FOREIGN PATENT DOCUMENTS

WO    WO0167936      9/2001
WO    WO2012078310   6/2012

*Primary Examiner* — Ellen M McAvoy
*Assistant Examiner* — Chantel L Graham
(74) *Attorney, Agent, or Firm* — Defillo & Associates; Evelyn A. Defillo (57) ABSTRACT

A fire start fuel container device including a container defined by side walls forming walls which contains a plurality of holes marked with suction, the holes arranged on at least one of the side faces with alternating arrangement in the central part and below the middle on an equatorial axis for each lateral face; and also has a face that forms the base and another face that makes the cover, which have a hole cut in the middle, which is larger diameter than the side holes, where all the faces define a space that it stores combustible material inside, including a fire initiating mechanism inside it, which is composed of a medium based on cellulose located in the central part of the container whose height reaches the entire height of the container, additionally the walls of the container. Fire initiating mechanism has a plurality of holes spaced equidistantly and arranged alternately one below or above the other on its entire surface, additionally has at its base two wax-coated wicks that cross each other and are fixed to the mechanism fire starter through four holes through which the ends of the wicks pass and by a stop preventing them from coming off, said stop made Referentially by a knot of the same wick.

8 Claims, 9 Drawing Sheets

(56) References Cited

U.S. PATENT DOCUMENTS

2007/0044377 A1    3/2007  Correa
2009/0277438 A1*  11/2009  Fischer .................... C10L 5/36
                                                  126/25 B
2011/0083658 A1    4/2011  Dudley

* cited by examiner

FUEL-CONTAINING FIRE-STARTING DEVICE

CROSS REFERENCE TO RELATED APPLICATION

This application is a national stage entry of PCT/MX2016/000096 filed Sep. 27, 2016, under the International Convention claiming priority over Mexican Patent Application No. MX/a/2016/002437 filed Feb. 23, 2016.

TECHNICAL FIELD

The present invention pertains to the field of kitchen equipment, particularly to the area of the equipment used in roasts or grilled and more specifically refers to a fire start fuel container device

BACKGROUND OF THE INVENTION

For many years the fuel industry has existed and prevailed, in different cultures and countries, as a means of ignition and heat generator to heat and cook foods that could only obtain a unique consistency and flavor from a cooking carried out through direct fire and embers.

This industry from its origins and throughout all these years, has faced a great and constant challenge that to date has not been able to solve everything: the best combustion material and the best technique so that easy, safe, efficient and fast, allow users to light by themselves and without complications, a direct fire and embers capable of heating and cooking their food. Without a doubt, it has not been easy to realize because the presence of elements in the opposition and interferes with that of others. For example, if it is a technique and the material of a rapid ignition, this usually does not have enough security for the user, or if a safe technique is found, it is usually not a fast and efficient option.

For this reason, giving solution to the aforementioned challenge from an integral and global perspective fulfilling each of the elements (ease, simplicity, safety, efficiency and speed) is an important part of the justification of our present invention.

Now, continuing with the important items in the state of the art, it is mandatory to mention the combustion material, whose main purpose is to achieve a constant and lasting flame of fire, capable of generating the ideal heat and temperature to give rise to the firing of foods. Generally, over the last few years, charcoal, briquettes and compressed materials have been preferably used as combustion products in this industry.

In the case of ignition methods, very similar techniques are currently used to ignite a certain amount of combustible products. We will focus mainly on the technique that is directly related to the main reason for existing and purpose of this invention: heat and cook food in open-air grills. This technique is not at all easy and simple, it can result in most cases complex, but it is the most used technique to light charcoal, briquettes and/or compressed materials.

Basically it consists of stacking the pieces of combustible material in the form of a pyramid on a tray or barbecue grill, an anafre or any surface. Once the pyramid-shaped material is stacked, an ignited match or a lighter is lit so that the temperature of the direct fire initiates the ignition of the combustion material (usually coal). This technique is too slow and requires a great effort on the part of the user because to increase the size of the flame of fire, it is essential to feed it with oxygen. That is, you must provide and pour abundant air flow (constantly) to the flame to increase and expand the fire and temperature to the rest of the combustion material, otherwise the existing flame will weaken and extinguish.

Other techniques belonging to the field of the invention are those described in the applications U.S. Pat. Nos. 6,622,716, 6,685,474, 6,790,244, 7,670,392, 7,789,919, 7,823,576, 8,118,887, 9,131,803, US 20040025419, US 20040170577, US 20060042618, US 20060156621, US 20070044377, US 20070092455, US 20080092437, US 20080190410, US 20090007826, US 20090277437, US 20090277438, US 20100263270, US 20110061641, US 20110083658, US 20110214663, US 20130340740, US 20140261375, EP 1547500 A1, WO 2006026369 A2, WO 2009117433 A1, WO 2012057716 A1, which are intended to facilitate the obtaining and preservation of the flame, however, the closest ones are mentioned below, such as, for example, that described in U.S. Pat. No. 2,834,661 A, which refers to a self-igniting fuel package comprising an easy combustion container having fuel inside thereof, said outer spaced container and interior wall means joined in their ends around its peripheries providing a seal to the dust, said inner wall makes the same time a chimney.

On the other hand, it is known from the U.S. Pat. No. 4,953,533 A, which discloses a package of fuels for the purposes of cooking outdoors and making barbecues. The fuel package consists of an octagonal platform, a chimney located in the center, a wall joined along the perimeter of the platform, a plurality of legs, and a lighter. The platform has a central opening that is contiguous with the chimney, a plurality of secondary openings uniformly located between the central opening and the perimeter of the platform, and a plurality of peripheral openings.

U.S. Pat. No. 6,328,028 B1 describes a package of portable, stackable, all-in-one fuel material, consisting of a cardboard box without internal structure and containing charcoal or other combustible material, a cardboard blank One-piece to form the starting cardboard box, and the mounting methods and the use of the carton and its components to provide a source of heat. The cardboard box includes selectively foldable legs to raise the cardboard box out of a sufficient one for the placement of a lighter under the box and allow the flow of air to the base of the container to maintain the combustion of the material inside the container. In use, the lighter is removed from the carton, the legs are unfolded to lift said cardboard box, the lighter is placed under the cardboard box and between the legs, the lighter is ignited and the box is allowed to burn. cardboard and ignite the charcoal lodged inside.

Of more recent creation, the application US 201300340740 A1, provides a fuel support for use with a coal lighter fireplace, comprising: a unitary device of a non-combustible material having a flat base and at least three straight peripheral walls, said walls are separated, forming vertical grooves between them, to the position and fire support starters.

One of the closest documents is the publication US 20110083658 A1, which discloses a portable and disposable device to ignite the coal or other flammable material contained therein. A central compartment generally in the form of a tube extends from a lower part of the apparatus through the center of the main body of the apparatus. An ignition strip extends inside the tube. The appliance is made of paper or cardboard or another flammable, but durable.

The disadvantages that occur in most cases on the known inventions are mentioned below:

Many users find the process of generating a first direct and constant flame that manages to ignite all the combustion material evenly difficult. In most cases the flame generated is not strong and constant enough, so it is easily extinguished or fails to ignite all combustible material.

Both hands are used for the ignition process. Since at all times the hands are very close to the fire, they are in permanent danger. On the other hand, commonly to solve the problem of complexity and speed there are flammable materials (commonly liquids) that must be poured on the combustion material, being able in some cases to generate an accident that causes a damage to the user as serious burns on the face or hands derived from the great flames.

They require uninterrupted attention. It is necessary the permanent supervision by the user to achieve the correct and suitable ignition, because as the combustion materials are activated (for example, vegetable coals), these generate large flames of fire so they must be accommodated, either to control or to activate the combustion material that still or it has turned on. That is, you must place the combustible material already lit near the one that is not yet so that the heat and fire can turn it on.

Something very common that is still a problem is the waiting time. This constant can be due to different reasons; One may be the low ambient temperature, which prevents rapid ignition. Another option is that the combustion material is of low quality or because of the weather conditions present humidity.

In addition, in most cases and without considering external factors, this constant is directly proportional to the experience and ability of the user to light the fire.

As mentioned above and due to the same complexity, users commonly buy extra materials to ensure ignition of the combustion material, such as dry tinder, dry wood chips, newsprint, paper napkins, resinous wood sticks such as the "ocote", flammable liquids such as gasoline, alcohols, alcohol spheres, alcohol capsules, flammable additive pastes, among others. This constant can only reflect and reinforce the following idea: It is very difficult to ignite the combustible material (usually charcoal) to cook and heat the food, therefore, they are selling complementary products that seek to make this activity less difficult.

The process of handling combustion material, mainly coal, brings with it dust and dirt. In most cases the user ends up getting his hands and thorax dirty. In other cases it can have a direct effect on your eyes due to the jump of dirt from the fuel, bringing greater complications.

In summary, we can identify that, although the industry of the combustion material and the food preparation under the technique of fire and embers has been growing over the years, it has presented different complications in the practice of ignition and does not exist the date an integral solution, which not only satisfies existing users, but also attracts more people or a captive market to this industry.

In this way, with all the above mentioned and once cited the constants to which the user has faced and is currently facing, it is as can be argued and validate the existence and justification of the proposal described in this report, as an easy, simple, safe, efficient and fast solution alternative.

BRIEF DESCRIPTION OF THE INVENTION

A fire start fuel container device, comprising a main casing intended to be the cover of a combustible material that is housed inside, wherein each of its faces consists of one or more blanks or swabs arranged for the purpose of provide removable sections, the distance from the edges to which the centers of the blanks or swats are located on the faces of the main casing depends on the face in which they are placed, which are located at the intersection of the diagonals of a of the faces or in the lower part of the equatorial axis of the same; additionally, in connection with the axial line of the upper and lower removable sections of the main housing a combustion body surrounded by the combustible material is disposed in its inner central part, which has a cylindrical body with a plurality of holes located with the purpose of giving way to the necessary comburent in the process of inflammation which, together with the air passing through the removable sections, generates a vortex with the air flow that enters the fire start fuel container device; the interior of the body for combustion comprises a combustion initiating wick covered with liquid wax, which passes through the holes located in the body for combustion, in its lower part, arranged in the form of a cross and fixed by knots.

DESCRIPTION OF THE INVENTION

The development of the present invention is aimed at solving in a comprehensive manner a technical problem that for many years has been present in the fuel ignition industry, which is related to the purpose of providing a device capable of increasing the temperature efficiently to start the fire of a combustible material that is preferably used for cooking food.

As explained above, the current mechanisms and/or techniques for igniting combustible material (usually charcoal) are complex, unsafe, slow, unhygienic and in some cases inefficient, forcing the user to buy complementary products because they are time-consuming and effort.

The present invention solves each of the elements of this technical problem from a global and integral perspective.

This invention relates to a fire start fuel container device (1) which keeps in its configuration a series of main elements for its correct operation, under normal operating conditions, said elements are a main container (10), a body for combustion (20), a combustion initiator wick (30) and a combustible material (40).

The main container (10) is a component of the invention intended to be the cover of some combustible material (40) that is housed therein. Advantageously, the main container (10) is made of any of the following materials: kraft paper, paperboard, compressed cellulose, wood, simple cardboard, corrugated cardboard (single or multi-wall) or micro-corrugated, gray cardboard, compact cardboard, corrugated cardboard, cardboard couché (fine classic or modern), paraffin, cellulose or brown paper, preferably, combinations thereof or any material that can be extinguished.

The main container (10) is intended to be consumed at some point along with the combustible material (40) that houses inside, which may be pieces of charcoal, coal, pieces of hard wood, pieces of soft wood, resinous woods, compressed wood, briquettes, dry tinder, dry brush litter, dry wood chips, newsprint, paper napkins, sticks of resinous wood such as "ocote", accompanied, added, sprayed, impregnated, painted, dyed, muddy, moistened with some other flammable material such as oils, alcohols, gasolines, varnishes, solvents, gels, petroleum, kerosene, benzene, gases, gunpowder, or any solid fuel.

Figure 7:
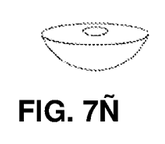
Figure 7A:
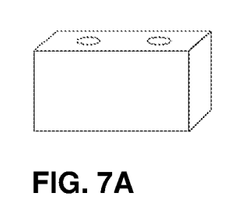
FIGS. 7A-R shows an isometric view of the different shapes presented by fire start fuel container device.
Figure 7B:
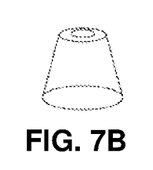
Figure 7C:
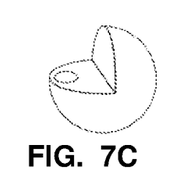
Figure 7D:
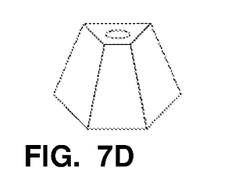
Figure 7E:
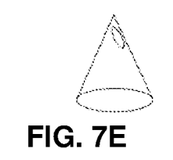
Figure 7F:
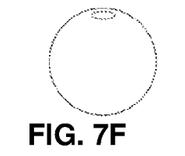
Figure 7G:
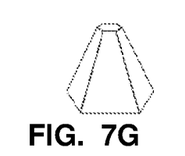
Figure 7H:
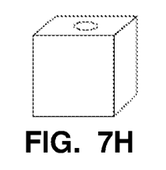
Figure 7I:
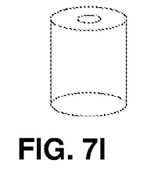
Figure 7J:
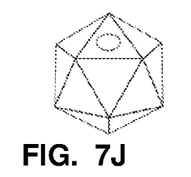
Figure 7K:
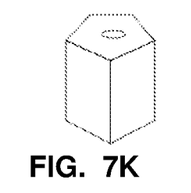
Figure 7L:
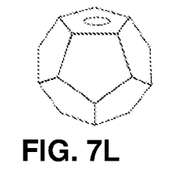
Figure 7M:
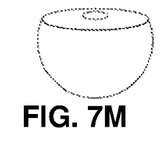
Figure 7N:
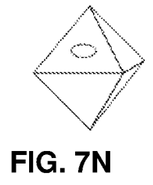
Figure 7O:
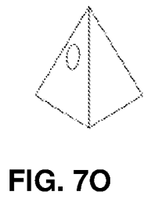
Figure 7P:
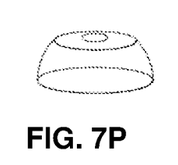
Figure 7Q:
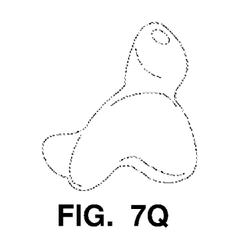
Figure 7R:
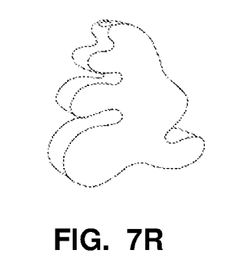

The preferential form of the main container (10) is cubic, although it could adapt other forms of any polygonal or irregular cross section that provides the necessary strength to contain some or some of the aforementioned combustible materials with a preferred capacity of one to five kilograms (see FIGS. 7A-7R).

Regardless of the shape of the main container (10), the union of their faces is given through folds or tabs (11) located on the periphery thereof, on each of its faces consists of one or more stamped or Swabs arranged for the purpose of providing removable sections (12), which adopt a preferential circular shape can also be polygonal or irregular, so that at a certain time the user gets to press with your fingers removing these sections to get a hole. The distance with respect to the edges to which the centers of the blanks or swats are located on the faces of the casing depends on the face in which they are placed, and can be located at the intersection of the diagonals of one of the faces or in the lower part of the equatorial axis of the same.

Figure 11A:
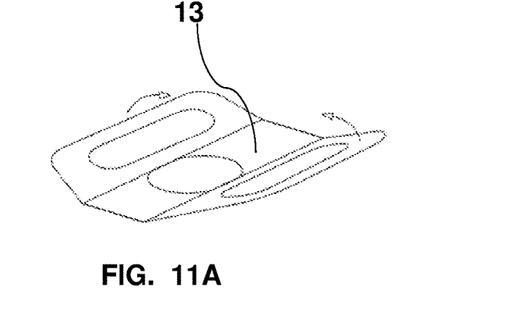
FIG. 11A shows a perspective front view of the handle of the fire start fuel container device.
Figure 11B:
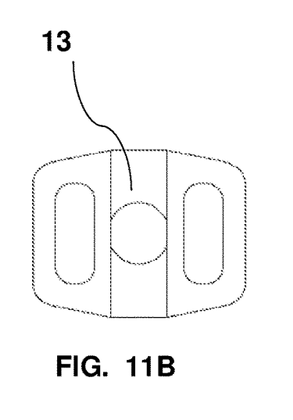
FIG. 11B shows a perspective side view of the handle of the fire start fuel container device.
Figure 12A:
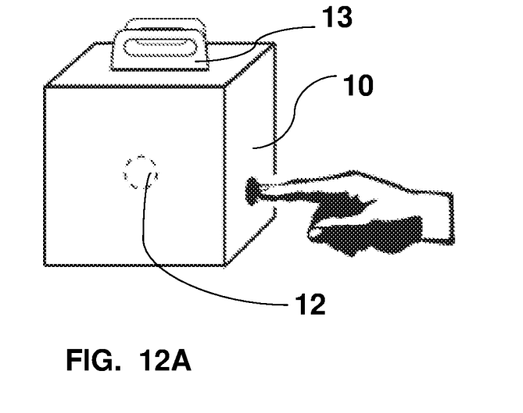
FIG. 12A shows a front view of the device according to the present invention fire start fuel container device being activated by the user.
Figure 12B:
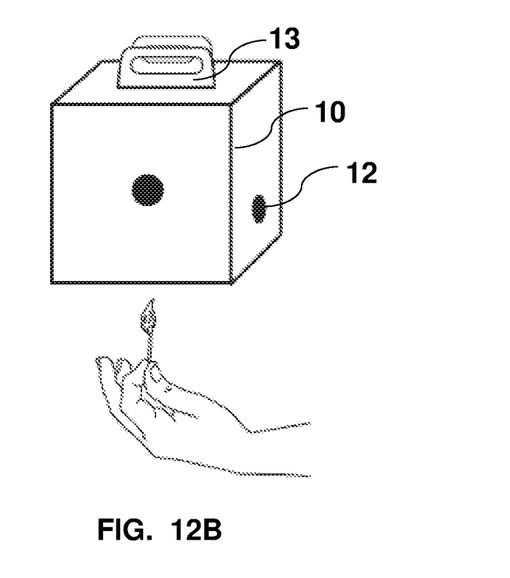
FIG. 12B shows a front view of device of the present invention being ignited by the user.
Figure 12C:
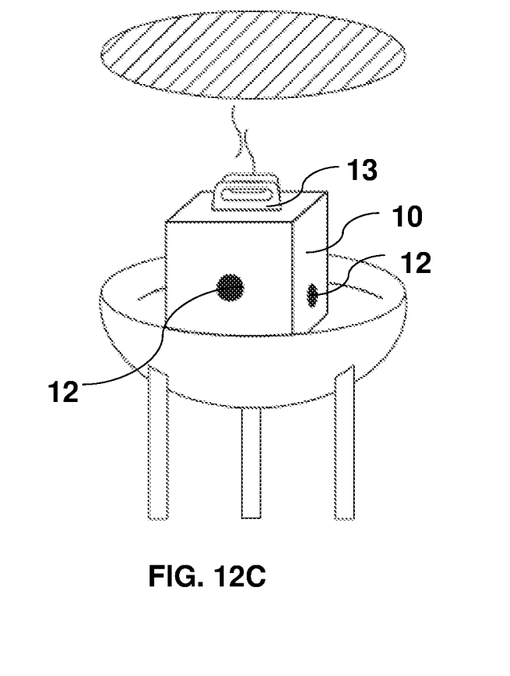
FIG. 12C shows a front view of the device of the present invention in a working position.
Figure 12D:
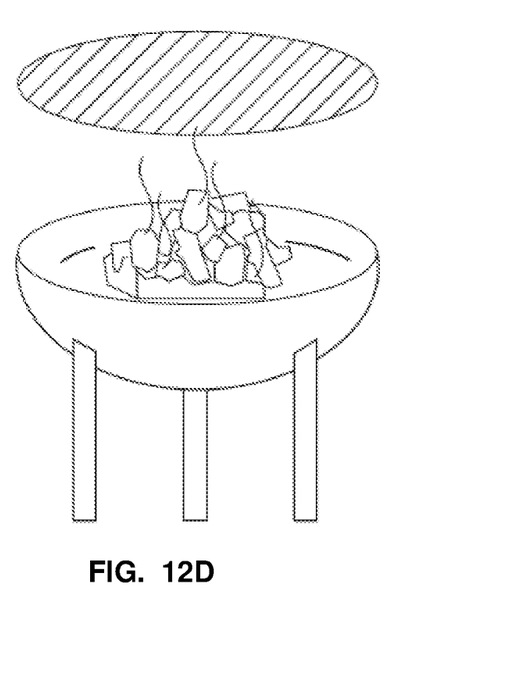
FIG. 12D shows a front view of device on a grill after the device has been activated.

In a preferred embodiment, the upper face or lid of the main container (10), has a handle (13) placed to provide a means of attachment for the user and thus the device can be transported from one place to another, in addition that provides the additional advantage that when using the device, it can be manipulated by a single person.

In connection with the axial line of the upper and lower removable sections (12) of the main casing (10) one of the essential technical characteristics of the invention is set out, of a combustion body (20), which is an element that it has a rectangular shape with a series of extensions and holes in its ends that when they are joined, they go on to keep a generally cylindrical shape, it is configured in such a way that it is inserted inside the main housing (10) in its middle part. It is an element that has a set of fastening tabs (21) at its ends that are respectively adapted to the upper and lower faces of the main casing (10). In one embodiment of the invention, it is contemplated that at least three tabs of fixing (21) are folded into the interior of the body for combustion (20), to be used to light the fire.

Advantageously, the surface of the combustion body (20) preferentially has a plurality of holes (22), which can be circular, polygonal or irregular. Said holes (22) are located with the purpose of giving way to the comburent necessary in the inflammation process and advantageously a whirlpool is generated with the air flow that enters the fire start fuel container device (1). Desirably, the combustion body (20) is made of any of the following materials: kraft paper, cartonboard, compressed cellulose, wood, single board, corrugated cardboard (single or multi-wall) or micro-corrugated, gray cardboard, cardboard compact, corrugated cardboard, cardboard couché (fine classic or modern), waxed, cellulose or brown paper, preferably, combinations thereof or any material that can be extinguished The interior of the combustion body (20) comprises a combustion initiating means (30), preferably a rope or wick made of a combustible material, which can be natural, artificial or synthetic textile fibers. Preferentially and advantageously, the combustion initiator wick (30) is coated with liquid wax to keep the flame longer. The combustion initiating wick (30) is positioned in such a way that it passes through lower holes (23) located in the combustion body (20), in its lower part, arranged in a cross shape so that when the fire starts it reaches the ends of the body for combustion. Advantageously, the combustion initiating wick (30), is fixed to the ends by knots (31), made so that at the time when heat is produced through an external medium and this is put on contact with an intersection formed by the wick is passed to ignition, the flame can reach the entire inner surface of the body for combustion. In the area where the knots (31) are located, there is a cross section of greater area, so that the heat generated by the combustion is advantageously greater, as well as the combustion time and consequently the flame has a greater range, after this starts the burning of the fuel housed inside the main casing (10), which can be firewood, charcoal, coal, coal coke or any solid fuel such as those mentioned above.

Another of the main characteristics of the invention is the way in which the combustible material (40) is placed (surrounding the body for combustion), which improves the transfer of heat by direct contact with it, as well as the destruction of the body for combustion (20), in this way the combustible material (40) housed inside the main casing already at a considerable temperature increase passes to occupy the space that was previously designated for the combustion body (20), thus forming a structure pyramidal that will gradually be consumed by the burning of the fuel until, finally, through the heat transfer through direct contact, the main housing (10) enters the combustion process so that the calorific energy is generated by the fire start fuel container device (1) is transferred to a different fuel and This way obtain an even greater heat source for a certain use.

The combination of the technical characteristics mentioned above, allow the present invention to offer a solution to the need to light fuels in general, preferably charcoal, to heat or cook food, without investing more than 30 seconds in the process of initiation of fire, which is also carried out in a very simple manner, that is, in only two simple steps that are to remove the removable sections (12) of the main casing (10) and through an external heat generating means in contact with the combustion initiating wick. (30) Start with the combustion process. Being able to take advantage of the time in other activities while the invention ignites in an isolated and safe way all the combustible material contained in the container, generating a fire and embers with uniform temperature, without the need of making more human effort to generate air flow or blowing, as well nor do you use any generator of air or wind such as palm blowers, hair dryers, any type of fan. The present invention can be placed on traditional stoves, grills, "anafres", grills, roasting trays, all types of kilns or on any surface where food can be heated or cooked in the open or in enclosed spaces with good ventilation.

The technical advantages are presented in the described invention and those which face to counteract in an integral way the technical problem are the following:

1.—Do not leave any solid contaminant residues since the fire start fuel container device (1) is completely consumed.

2. With respect to other similar products in the market where the package is a sack or a thick paper bag, the main casing (10) in question to be micro-corrugated cardboard preferably also forms part of the combustion system, so that it is not necessary to empty the content to turn it on, because it is consumed as a whole and in this way the combustion is accelerated.

3. The ignition mechanism of this invention formed by the combustion body (20) and the combustion initiating wick (30) allows that the ignition does not represent a greater risk in the handling of the fuel, since it reduces the probability of burns, since you do not need to have direct contact with the fuel contained inside.

4. The use of this invention allows to ignite a fuel preferably charcoal in just two steps, unlike the other similar products in which more than 4 steps are necessary to turn it on.

5. With other techniques of ignition of fuel takes more than 20 minutes to reach the desired temperature, also requiring continuous care and attention to generate an air flow and accommodate the fuel to obtain an ideal temperature, with the use of this invention the time is reduced in a range of between 25 and 50%, depending on the conditions of humidity, ambient temperature, wind and other climatic conditions, allowing to take advantage of the time to do other activities in which the fuel preferably charcoal reaches the desired temperature to start heating or cooking food, as it does not require more attention.

BEST METHOD KNOW FOR CARRYING OUT THE INVENTION

The present example is illustrative and not limiting, since a person skilled in the art will understand that there are variants that fall within the scope of protection of the present invention.

The present invention can be made from different materials such as heavy-gauge papers, cardboards, paperboard, kraft paper, corrugated cardboard, micro-corrugated cardboard or those mentioned in the description of the invention.

The selection of materials for packaging mentioned above in this document does not affect the operation of the invention. That is to say, whatever the material used, of the aforementioned, for the creation of the fire start fuel container device (1) will comply with the designations conferred on it.

Said the above, preferably but not limiting is presented in the form of a cube as a base figure in the following construction and assembly instructions, as well as micro corrugated cardboard of material.

Fabrication and Assembly of the Main Housing (10)

1. To develop a plan to which a die-cut or "suaje" will be applied, designed to produce a template that will later become a volumetric figure, in this case we present the plan to start building a cube. The "suaje" (also called die) is a very useful tool made with steel plate to cut, bend or mark soft materials, such as: paper, cloth, leather, etc. The cutting plates are strips of metal with a sharp edge on one side. The folding plates do not have a sharp edge. There are plates for continuous cutting, intermittent cutting or bending. To make the cut we use a press called a milling machine, which presses the material against the cut and cuts, doubles or marks it. The use of this tool is common in the preparation or sharpening of cutting saws, circular or linear, since it is used to create the "cutting step", bending alternately on each side of the belt or saw, the teeth, with the object to "face" the edge of the tooth with the material to be cut.

Figure 8A:
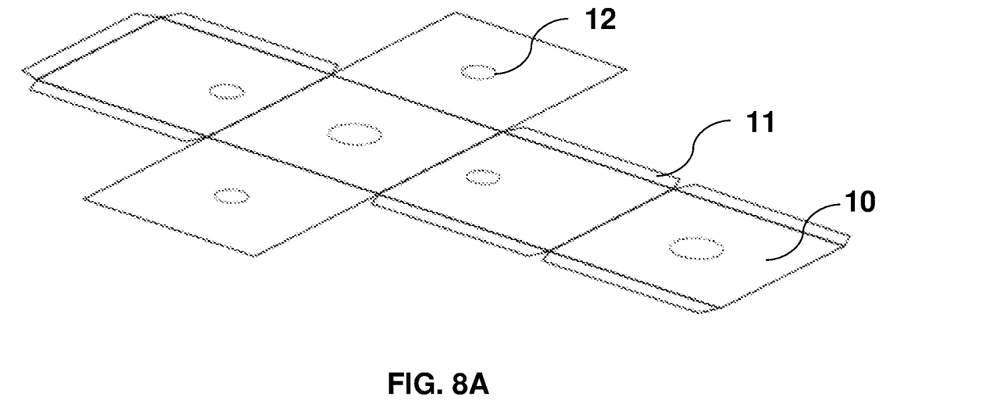
FIG. 8A shows an perspective front view of the deployed main housing.

2. Using a cardboard slicing machine we will obtain a cut piece already with the figure of the cube in extended form, with its respective tabs (11) as well as a plurality of grooves marked by the swaging that facilitate the folding to get each module or face of the main housing (10). In the swaging application a removable section (12) of different diameter is also created in each of the faces of this cube.

Figure 8B:
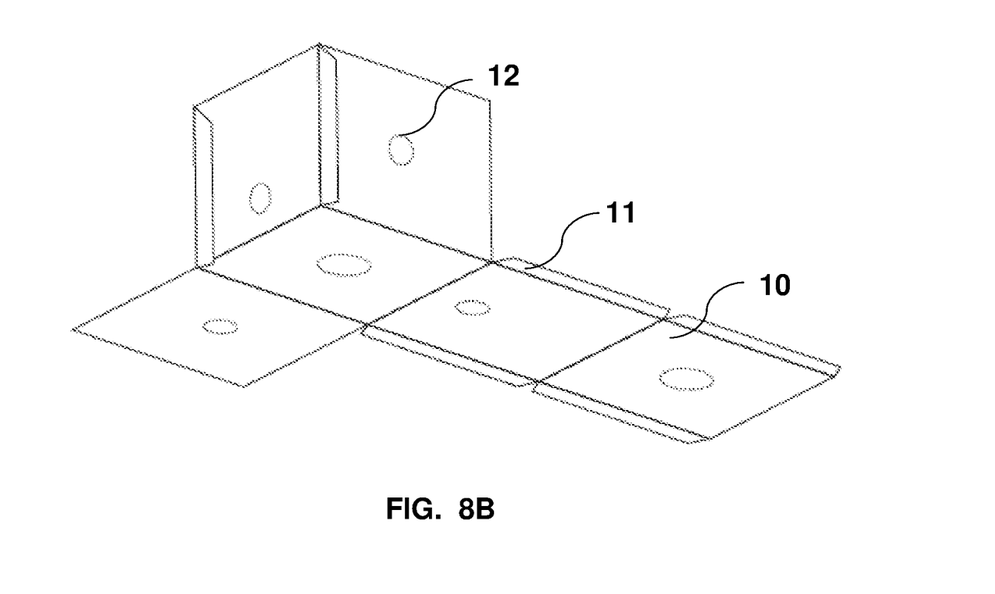
FIG. 8B shows an perspective front view of the main housing in a semi-assembled position.

3. Special resistant glue is applied for cartonboard in each of the tabs (11) to proceed to glue and join each of the faces, leaving the last top face unbound to allow us to deposit the combustible material (40).

Manufacture and Assembly of the Body for Combustion (20)

1. Develop a plan to manufacture a "suaje" or template, designed to produce a volumetric figure, in this case we present the plan to start building a cylinder. The suaje (also called die) is a very useful tool made with steel plate to cut, bend or mark soft materials, such as: paper, cloth, leather, etc. The cutting plates are strips of metal with a sharp edge on one side. The folding plates do not have a sharp edge. There are plates for continuous cutting, intermittent cutting or bending. To make the cut we use a press called a milling machine, which presses the material against the cut and cuts, doubles or marks it. The use of this tool is common in the preparation or sharpening of cutting saws, circular or linear, since it is used to create the "cutting step", bending alternately on each side of the belt or saw, the teeth, with the object to «face» the edge of the tooth with the material to be cut.

Figure 9A:
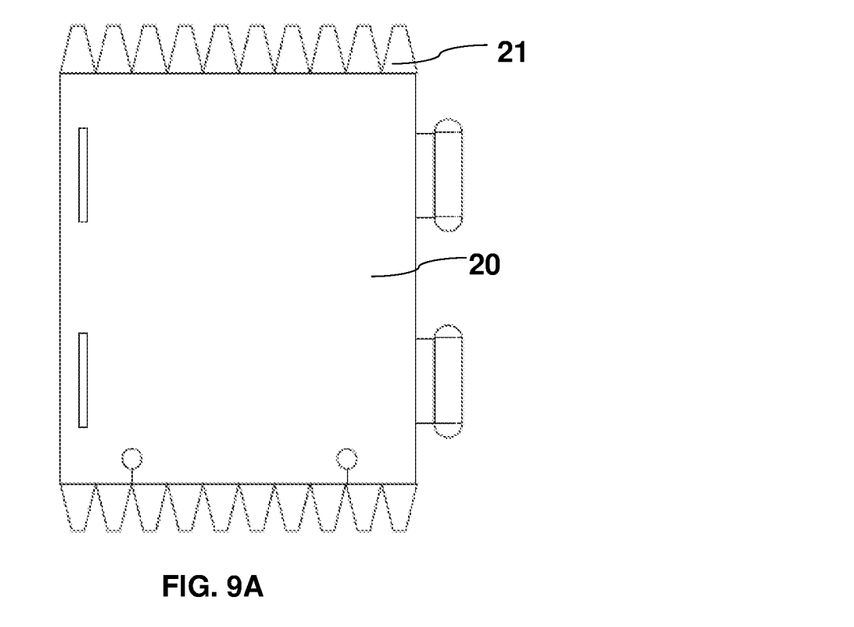
FIG. 9A shows an isometric view of the body for expanded combustion device.
Figure 9B:
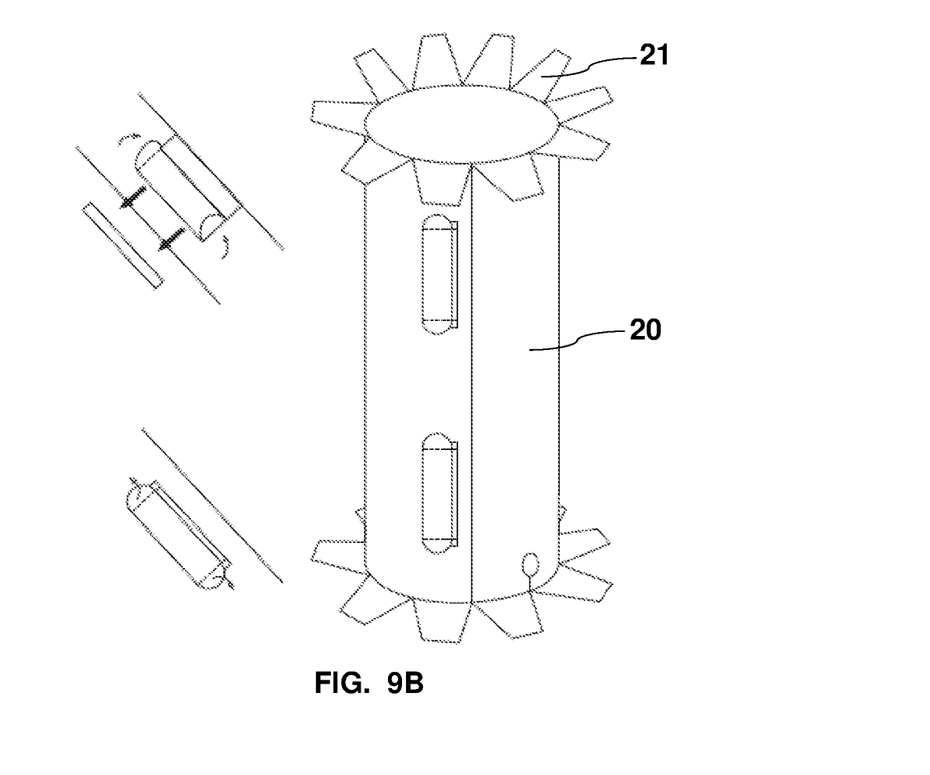
FIG. 9B shows a front view of the body for expanded combustion device.
Figure 10:
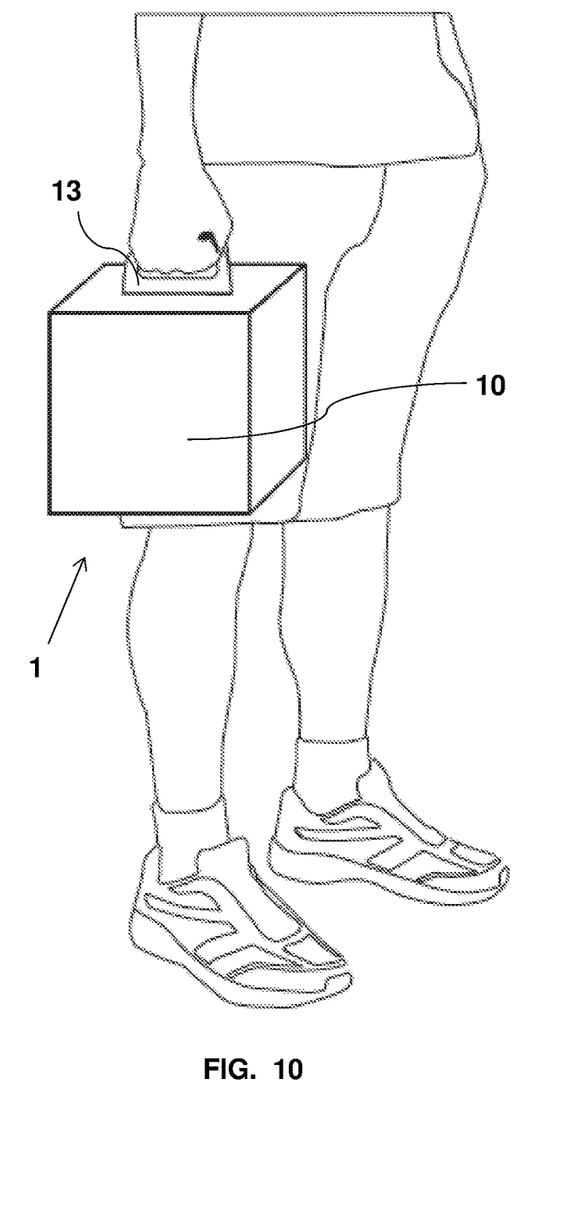
FIG. 10 shows a front view of the possibility of easy transport of the fire start fuel container device.

2. Using a cardboard slicing machine, we will obtain a cut piece already with the figure of the cylinder in extended form, in such a way that the combination of grooves marked by the suture facilitates the bending to obtain each module or each face of the figure. There are also holes (22) and fastening tabs (21) that are also made by the die.

Fabrication and Assembly of the Combustion Initiator Wick (30)

A wick is a cord of twisted threads of combustible material that serves to ignite or illuminate. For the present invention we will use twisted natural textile fibers that can make a constant flame, for this we need that the set of twisted yarns have at least one gauge (3 mm) in diameter and (10 cm) in length.

1. Once we have a stretch of cord, we make a simple knot at each end or end of the stretch, later when we have the two knots, we impregnate each section with paraffin wax since paraffin wax is usually found as a waxy solid, white, odorless, devoid of flavor, with a typical melting point between 47° C. and 64° C. It is insoluble in water, although it is soluble in ether, benzene, and some esters. Paraffin is not affected by the most common chemical reagents, but it burns easily.

To get it to be impregnated with wax or paraffin in each of the stretches of the cord, you have to increase the temperature in it, since only in a liquid state it will be able to penetrate between the strands of the wick.

To melt the wax or paraffin wax several pieces of wax or paraffin in solid state on a metal container, this is subjected to a high temperature either with the help of a traditional oven or preferably a gas stove, to reach a temperature of 60° C. change its state from solid to liquid, in this way the wax expands considerably when it melts and penetrates between the strands of the wick.

Figure 1:
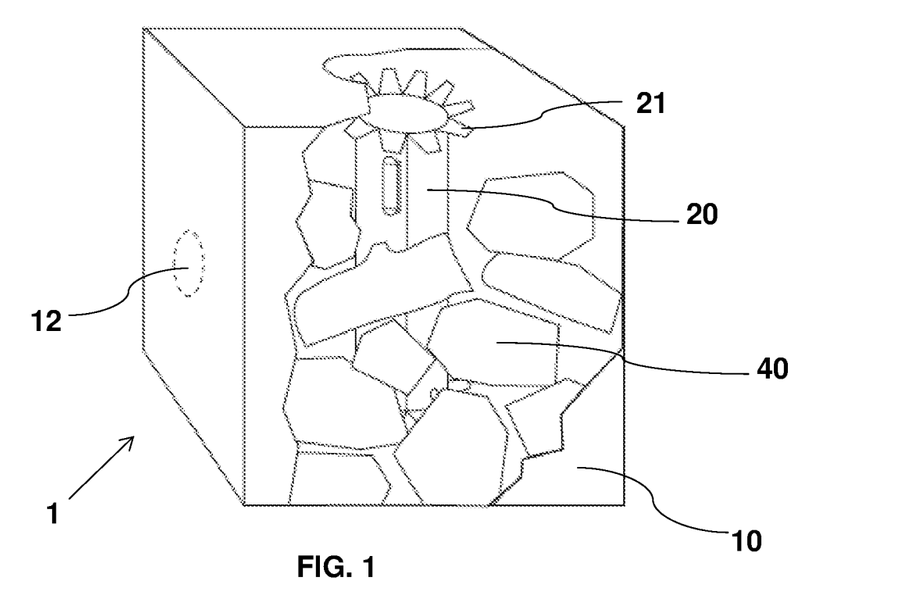
FIG. 1 shows an isometric view of the interior of the fire start fuel container device.
Figure 2:
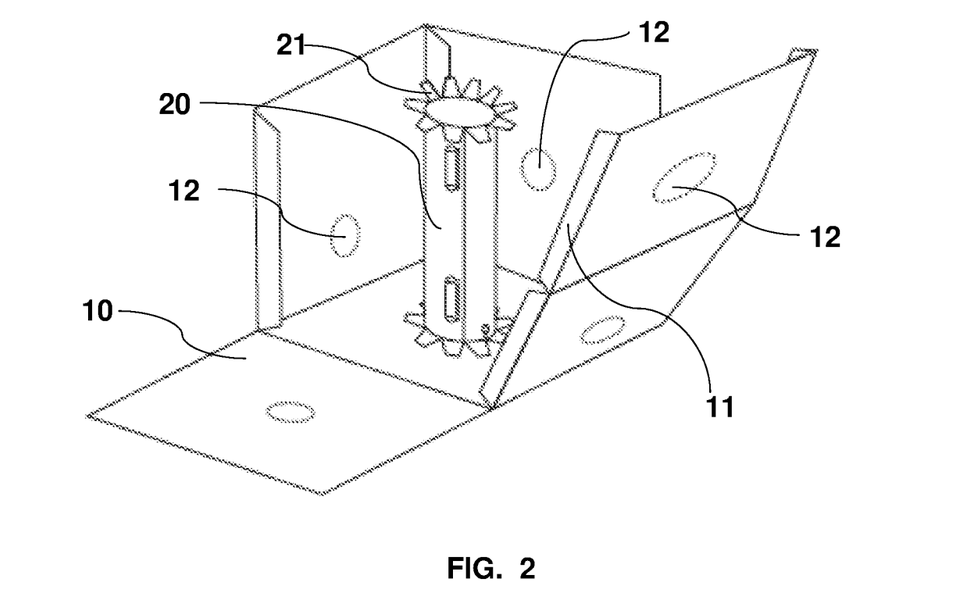
FIG. 2 shows an isometric view of the fuel initiating fire start fuel container device, where the body for combustion is observed.
Figure 3A:
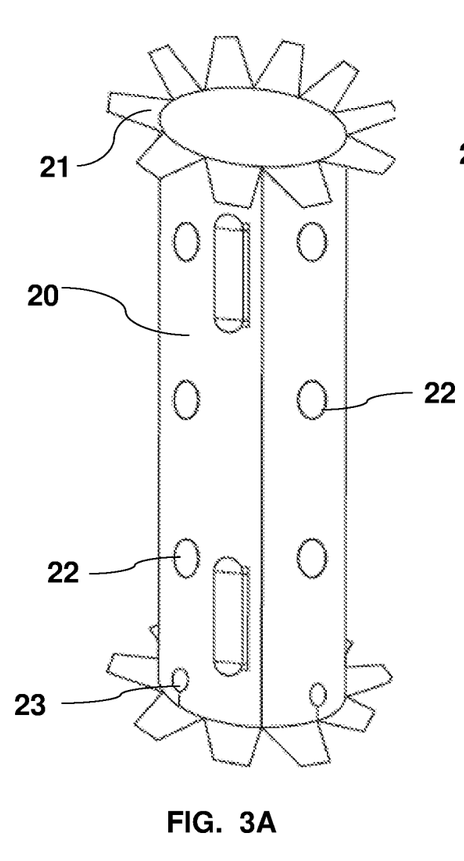
FIG. 3A shows a front view of the body for combustion.
Figure 3B:
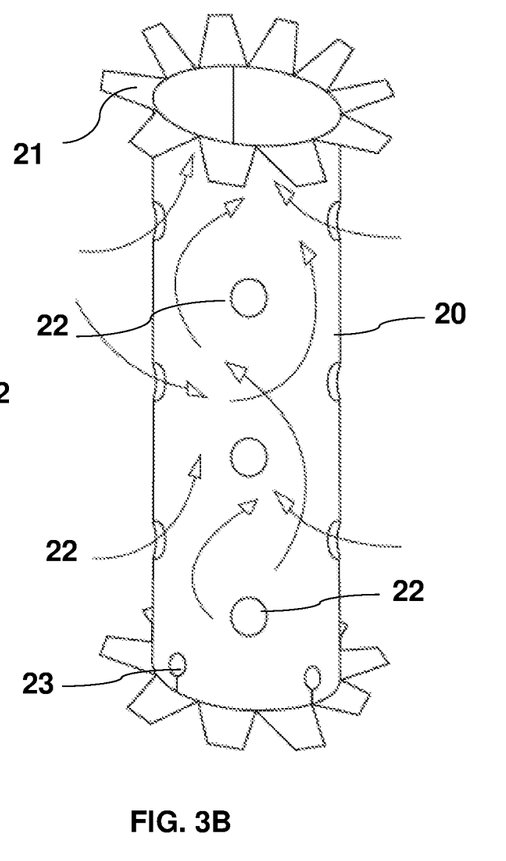
FIG. 3B shows a of the body of combustion of FIG. 3A showing the air flow.
Figure 4A:
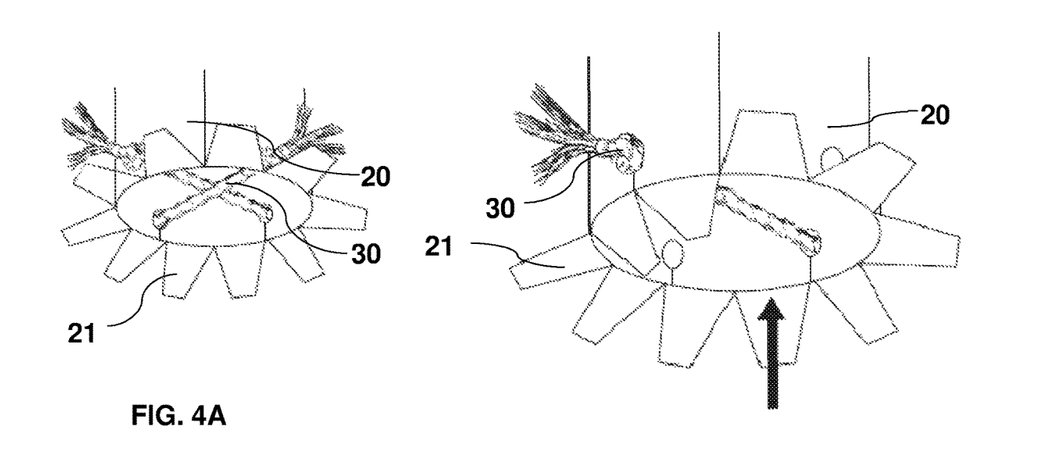
FIG. 4A shows a perspective front view of the bottom section of the combustion initiator device showing combustion initiator wick.
Figures 4B, 4C:
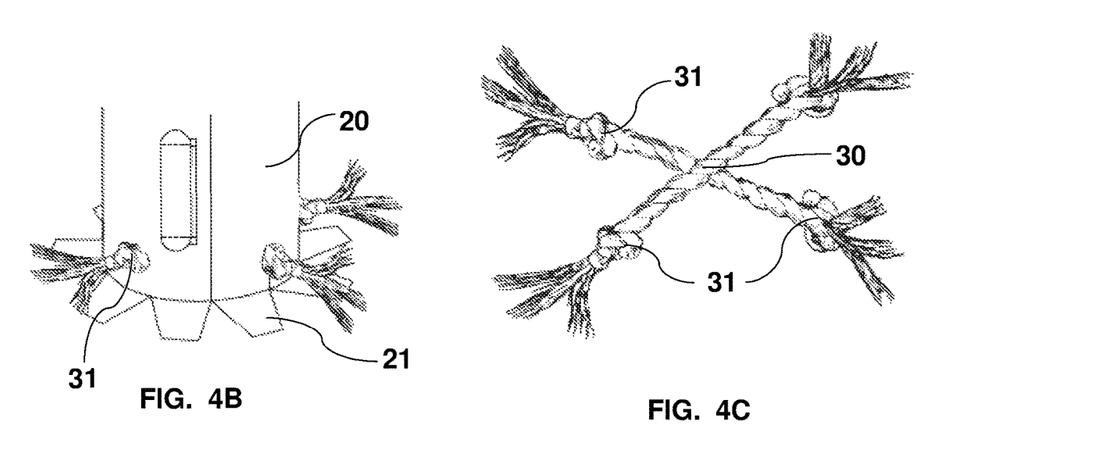
FIG. 4B shows a detailed view of the bottom section of the device of FIG. 4A.
FIG. 4C shows and exploded view of the device of FIG. 4A.
Figure 4D:
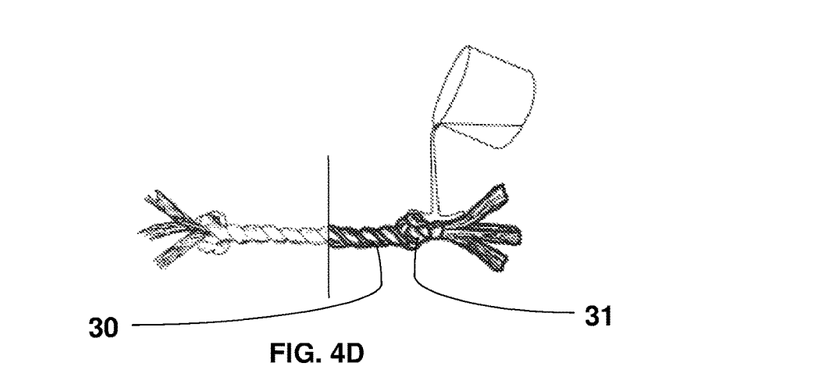
FIG. 4D shows detailed view of the bottom section of the device of FIG. 4A showing the wick being soaked.
Figure 5:
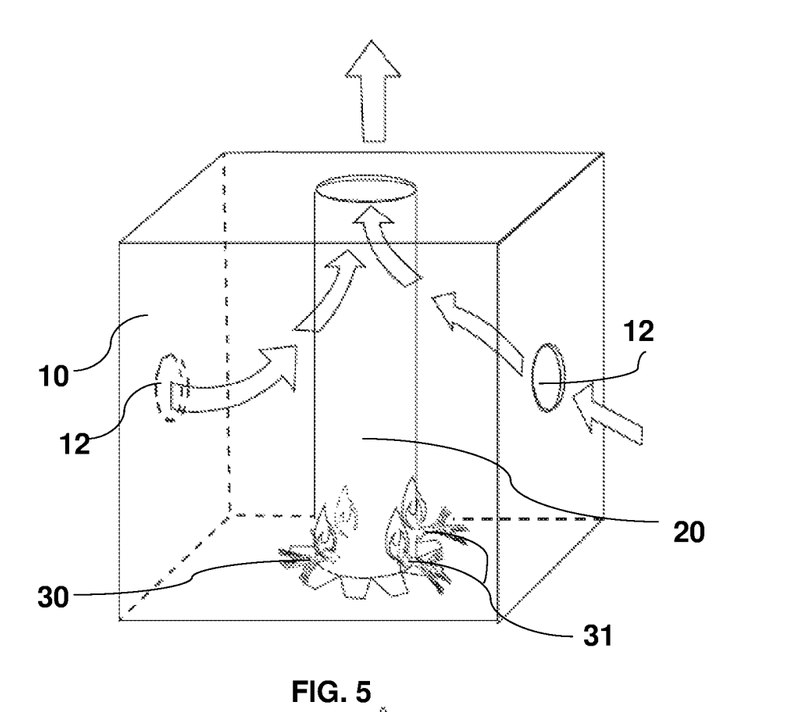
FIG. 5 shows an isometric view of the interior of the fire start fuel container device.
Figure 6:
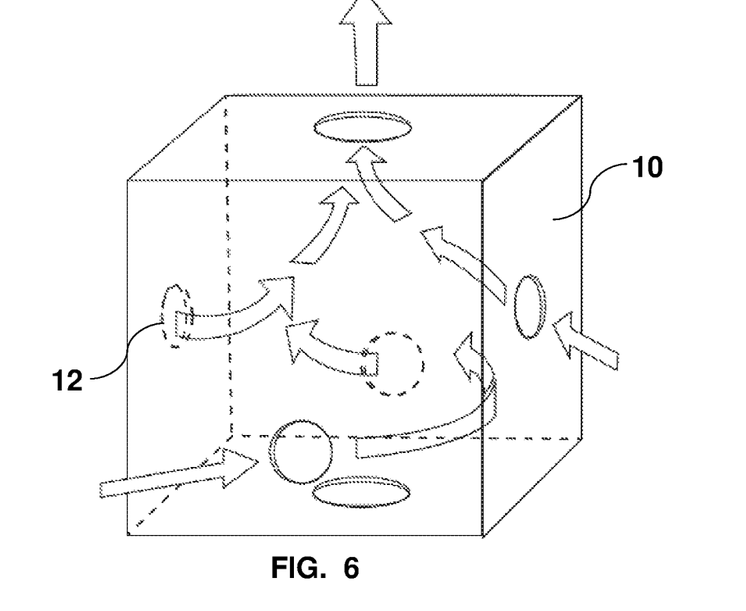
FIG. 6 shows an isometric view of the interior of the fire start fuel container device where the air flow is appreciated.

2. The wick is inserted in the holes placed in the lower part of the body for combustion (20).

Assembly of Fire Start Fuel Container Device (1)

1. Once the main casing (10) has reinforced and glued the side faces and the base applies special resistant glue for cartonboard in each one of the tabs (21) of the body for combustion (20) to later join it, of so that only the bottom base of the cylinder is stuck, leaving the tabs on the upper end free.

2. The selected combustible material (40) is deposited.

3. The upper flanges of the combustion body are joined to the lid of the main housing, in this way the device is closed.

Although the foregoing description was made taking into account the preferred embodiments of the invention, it should be borne in mind by those skilled in the art that any modification of form and detail will be within the spirit and scope of the present invention.

The terms in which this report has been written should always be taken in a broad and non-limiting sense. The materials, form and description of the elements, will be susceptible of variation as long as it does not suppose an alteration of the essential characteristic of the model.

The invention claimed is:

1. A fire start fuel container device comprising:
a main casing (10) designed to house a combustible material (40), the main casing including;
a plurality of faces, each one of the faces includes;
at least one die-cut section to provide removable sections (12), the removable sections (12) are located at an intersection point of the diagonals of each one of the faces;
a combustion body (20) located inside the main casing (10), the combustion body (20) is surrounded by the combustible material inside the main casing (10), the combustion body (20) includes;
a cylindrical body having a top end, a bottom end;
a plurality of holes (22) through the entire surface of the cylindrical body, the plurality of holes is separated at equidistant distance;
a plurality of fastening tabs connected to each one of the top end and the bottom end of the cylindrical body;
a combustion initiating wick (30) located inside the cylindrical body, the combustion initiating wick (30) covered with a liquid wax, the combustion initiating wick (30) includes a plurality of segments, the plurality of segments are arranged in the form of a cross, each one of the segments has a knotted end, each one of the knotted ends pass between two adjacent fastening tabs on the bottom end of the combustion body (20) to fix the combustion initiating wick (30) into the cylindrical body;
wherein the plurality of holes (22) of the combustion body and the air passing through the removable sections of the main casing provide the device with the comburent in the process of inflammation, generating a vortex with the air flow that enters the fire start fuel container device (1).

2. The fire start fuel container device according to claim 1, wherein the main container (10) is made from a material including: kraft paper, paperboard, compressed cellulose, wood, single cardboard, corrugated cardboard (of one or several walls) or micro-corrugated, gray cardboard, compact cardboard, corrugated cardboard, cardboard couché (fine classic or modern), paraffin, cellulose or brown paper, or combinations thereof.

3. The fire start fuel container device according to claim 1, wherein the main container (10) has a shape selected from polygonal, irregular cross section, or cubic.

4. The fire start fuel container device according to claim 1, wherein the combustible material (40) is selected from—charcoals, mineral coals, pieces of hard wood, pieces of soft wood, resinous woods, compressed wood, briquettes, dry tinder, litter of dry shrubs, shavings of dry wood, newspapers, paper napkins, sticks of resinous wood such as "ocote", accompanied, added, sprayed, impregnated, painted, stained, muddy, or moistened with some other flammable material such as oils, alcohols, gasolines, varnishes, solvents, gels, petroleum, kerosene, benzene, gases, gunpowder, or any solid fuel.

5. The fire start fuel container device according to claim 1, wherein the upper face or lid of the main container (10) has a handle (13).

6. The fire start fuel container device according to claim 1, wherein the combustion body (20) is made from a material selected from: kraft paper, paperboard, compressed cellulose, wood, single cardboard, corrugated cardboard (one or several walls) or micro-corrugated, gray cardboard, compact cardboard, corrugated cardboard, cardboard couché (fine classic or modern), wax paper, cellulose or brown paper or combinations thereof.

7. The fire start fuel container device according to claim 1, wherein the combustion initiator wick (30) is made of natural, artificial, or synthetic textile fibers.

8. A fire start fuel container device comprising:
a main casing (10) designed to house a combustible material (40), the main casing including;
a plurality of faces, the faces are connected to each other by tabs located on a periphery of each face, each one of the faces includes;
at least one die-cut section to provide removable sections (12), the removable sections (12) are located at an intersection point of the diagonals of each one of the faces;
a combustion body (20) located inside the main casing (10), the combustion body (20) is surrounded by the combustible material inside the main casing (10), the combustion body (20) includes;

a cylindrical body having a top end, a bottom end;

a plurality of holes (22) through the entire surface of the cylindrical body, the plurality of holes is separated at equidistant distance;

a plurality of fastening tabs connected to each one of the top end and the bottom end of the cylindrical body;

a combustion initiating wick (30) located inside the cylindrical body, the combustion initiating wick (30) covered with a liquid wax, the combustion initiating wick (30) includes a plurality of segments, the plurality of segments are arranged in the form of a cross, each one of the segments has a knotted end, each one of the knotted ends pass between two adjacent fastening tabs on the bottom end of the combustion body (20) to fix the combustion initiating wick (30) into the cylindrical body;

wherein the plurality of holes (22) of the combustion body and the air passing through the removable sections of the main casing provide the device with the comburent in the process of inflammation, generating a vortex with the air flow that enters the fire start fuel container device (1); and wherein the fire start fuel container is completely consumed during the process of inflammation.

\* \* \* \* \*